(12) United States Patent
Das et al.

(10) Patent No.: US 8,116,805 B2
(45) Date of Patent: Feb. 14, 2012

(54) UPLINK SCHEDULING FOR OFDM SYSTEMS

(75) Inventors: Arnab Das, Summit, NJ (US);
Prashanth Hande, Somerset, NJ (US);
Sundeep Rangan, Jersey City, NJ (US);
Xinzhou Wu, Urbana, IL (US)

(73) Assignee: QUALCOMM Incorporated, San Diego, CA (US)

( * ) Notice: Subject to any disclaimer, the term of this patent is extended or adjusted under 35 U.S.C. 154(b) by 1103 days.

(21) Appl. No.: 11/611,881

(22) Filed: Dec. 17, 2006

(65) Prior Publication Data
US 2008/0146241 A1  Jun. 19, 2008

(51) Int. Cl.
*H04B 7/00* (2006.01)
(52) U.S. Cl. ........ 455/525; 455/524; 455/101; 455/560; 370/331; 370/332; 370/334; 370/339; 375/267
(58) Field of Classification Search .............. 370/316, 370/318, 537, 248, 203, 208, 330, 338, 344, 370/235, 252, 331, 332, 334, 339; 455/302, 455/132, 63, 69, 522, 442, 434, 450, 517, 455/560, 422.1, 525, 524, 101; 375/267
See application file for complete search history.

(56) References Cited

U.S. PATENT DOCUMENTS

| | | | |
|---|---|---|---|
| 2003/0128658 A1* | 7/2003 | Walton et al. | 370/208 |
| 2005/0079865 A1* | 4/2005 | Ahn et al. | 455/434 |
| 2006/0203856 A1* | 9/2006 | Laroia et al. | 370/522 |
| 2007/0149137 A1* | 6/2007 | Richardson et al. | 455/68 |
| 2007/0165529 A1* | 7/2007 | Nakamura et al. | 370/235 |
| 2008/0014951 A1 | 1/2008 | Laroia et al. | |

FOREIGN PATENT DOCUMENTS

| | | |
|---|---|---|
| EP | 1246399 A1 | 10/2002 |
| EP | 1406419 A2 | 4/2004 |
| JP | 2001515666 A | 9/2001 |
| JP | 2003018117 | 1/2003 |
| JP | 2004128967 A | 4/2004 |
| JP | 2004532555 A | 10/2004 |
| JP | 2006514518 A | 4/2006 |
| JP | 2006520109 | 8/2006 |
| JP | 2006525775 A | 11/2006 |
| WO | WO9711535 | 3/1997 |
| WO | WO02093782 A1 | 11/2002 |
| WO | WO03058871 A1 | 7/2003 |

(Continued)

OTHER PUBLICATIONS

Chen, et al.: "An analytical framework for capacity and fairness evaluation in high speed wireless data networks," IEEE Global Telecommunications Conference, 2003, GLOBECOM '03, San Francisco, CA, vol. 2, pp. 955-960, XP010678463, ISBN: 978-0-7803-7974-9, Dec. 1-5, 2003.

(Continued)

*Primary Examiner* — Kamran Afshar
*Assistant Examiner* — Manpreet Matharu
(74) *Attorney, Agent, or Firm* — Donald C. Kordich

(57) ABSTRACT

Systems and methodologies are described that facilitate scheduling transmission, upon an uplink traffic channel in Orthogonal Frequency Division Multiplexing (OFDM) environments. Uplink scheduling may include user selection and rate selection. Further, user selection may be based on a token mechanism that provides control over fairness of allocation to disparate users. Moreover, rate selection may be based upon considerations of uplink interference mitigation.

34 Claims, 11 Drawing Sheets

FOREIGN PATENT DOCUMENTS

| | | |
|---|---|---|
| WO | WO2004075568 | 9/2004 |
| WO | WO2006011471 A1 | 2/2006 |

OTHER PUBLICATIONS

Cover et al.: "Elements of Information Theory", Wiley, New York, 1991, pp. 87-90, Chapter 5: Data Compression.
Cover, et al: "Elements of Information Theory," Wiley, New York, USA, XP002495077 pp. 250-253.
International Search Report—PCT/US2007/087665, International Searching Authority—European Patent Office—Oct. 16, 2008.
Olfat, et al.: "Power Aollocation for OFDM Using Adaptive Beamforming Over Wireless Networks," IEEE Transactions on Communications, vol. 53, Issue 3; pp. 505-514, p. 506, Mar. 1, 2005, XP011129567, ISSN: 0090-6778.
Partial European Search Report—EP10163826, Search Authority—Munich Patent Office, Oct. 26, 2010.
Partial International Search Report—PCT/US2007/087665, International Searching Authority—European Patent Office, Jun. 24, 2008.
Written Opinion—PCT/US2007/087665, International Searching Authority—European Patent Office—Oct. 16, 2008.

* cited by examiner

UPLINK SCHEDULING FOR OFDM SYSTEMS

BACKGROUND

I. Field

The following description relates generally to wireless communications, and more particularly to uplink scheduling in a wireless communication system.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing, (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Wireless Communication systems (e.g., OFDM systems) oftentimes schedule downlink and uplink transmissions. As an example, base stations commonly assign channels, times, frequencies, and so forth for mobile devices to utilize for communicating over the uplink. Conventional techniques, however, oftentimes fail to consider fairness in connection with uplink scheduling. Moreover, common uplink scheduling typically fails to leverage multi-user diversity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating scheduling of transmissions upon an uplink traffic channel in Orthogonal Frequency Division Multiplexing (OFDM) environments. Uplink scheduling may include user selection and rate selection. Further, user selection may be based on a token mechanism that provides control over fairness of allocation to disparate users. Moreover, rate selection may be based upon considerations of uplink interference mitigation.

According to related aspects, a method that facilitates uplink scheduling in an Orthogonal Frequency Division Multiplexing (OFDM) environment is described herein. The method may comprise selecting a user to transmit on an uplink traffic channel during a time-frequency slot as a function of a token value. Further, the method may include determining a rate for transmission on the uplink channel by the user. Moreover, the method may comprise sending an assignment to the user.

Another aspect relates to a wireless communications apparatus. The wireless communications apparatus may include a memory that retains data signaled over an uplink and instructions related to determining a token metric and a multi-user diversity metric based upon the signaled data, choosing a mobile device to transmit on an uplink traffic channel during a time-frequency slot based upon the token metric and the multi-user diversity metric, controlling a rate for uplink transmission based upon the signaled data, and transmitting an assignment to the mobile device on a downlink. Further, the communications apparatus may comprise a processor, coupled to the memory, configured to execute the instructions retained in the memory.

Yet another aspect relates to a wireless communications apparatus that schedules uplink transmission on traffic channels. The wireless communications apparatus may include means for selecting a mobile device for uplink transmission based upon a token metric and a multi-user diversity metric; means for identifying a rate for the uplink transmission based upon interference mitigation; and means for transmitting an assignment to the mobile device, the assignment includes data related to the rate.

Still another aspect relates to a machine-readable medium having stored thereon machine-executable instructions for receiving information signaled on an uplink, identifying a token metric and a multi-user diversity metric based upon the received information, and assigning a time-frequency slot for uplink transmission on a traffic channel to a mobile device as a function of a combination of the token metric and the multi-user diversity metric. The machine-readable medium may further have stored thereon machine-executable instructions for selecting a code rate for the mobile device to employ for the uplink transmission and sending an assignment that indicates the time-frequency slot, the traffic channel, and the code rate via a downlink to the mobile device.

In accordance with another aspect, an apparatus in a wireless communications system may include a processor, wherein the processor may be configured to schedule a user for uplink transmission on a traffic channel based upon a token. Further, the processor may be configured to determine a rate for the uplink transmission that mitigates interference. Moreover, the processor may be configured to transmit an assignment to the user that indicates the rate.

According to a further aspect, a method that facilitates signaling information over an uplink in connection with obtaining a scheduled assignment for transmission over the uplink is described herein. The method may comprise signaling information including a Beacon ratio report, a traffic priority, and a maximum power available to a base station over an uplink. Further, the method may include obtaining an uplink assignment including a rate from the base station, the assignment being generated at least in part upon the signaled information. Moreover, the method may comprise transmitting traffic on the uplink by employing the assignment.

Another aspect relates to a wireless communications apparatus. The wireless communications apparatus may include a memory that retains instructions for measuring an interference cost, sending the measured interference cost over an uplink, and receiving data allocating a time, channel and rate for uplink traffic transmission based upon a token metric that is determined by the base station as a function of the interference cost. Further, the wireless communications apparatus may include a processor, coupled to the memory, configured to execute the instructions retained in the memory.

Still another aspect relates to a wireless communications apparatus that signals a measured interference cost to a base station in connection with obtaining an uplink assignment. The wireless communications apparatus may include means for measuring an interference cost; means for transmitting the measured interference cost on an uplink; means for receiving an assignment allocated as a function of a token value, the token value being determined based upon the interference cost; and means for transmitting on an uplink traffic channel based upon the assignment, the assignment controls a rate associated with transmission.

Yet another aspect relates to a machine-readable medium having stored thereon machine-executable instructions for signaling interference data measured at a mobile device to a base station, obtaining an assignment of an uplink traffic channel, time-frequency slot, and rate, the base station selecting the mobile device for the assignment in view of a token value based at least in part upon the interference data, and employing the assignment to transmit on the uplink traffic channel.

In accordance with another aspect, an apparatus in a wireless communication system may include a processor, wherein the processor may be configured to receive information related to an allotted uplink channel, time-frequency slot, and rate at a mobile device, where the uplink traffic channel is assigned to the mobile device as a function of a token metric and a multi-user diversity metric. Further, the processor may be configured to transmit traffic on the allotted uplink channel during the time-frequency slot and at the rate.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
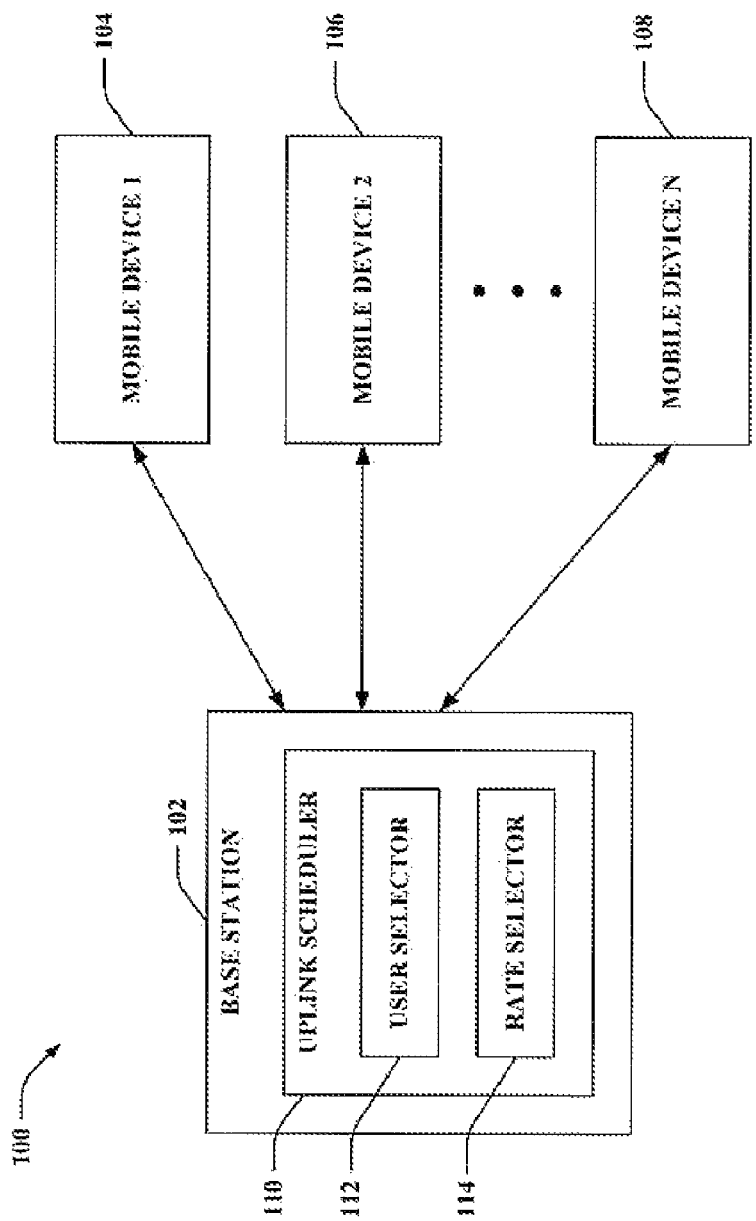
FIG. 1 is an illustration of an example wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device may refer to a device providing voice and/or data connectivity to a user. A mobile device may be connected to a computing device such as a laptop computer or desktop computer, or it may be a self contained device such as a personal digital assistant (PDA). A mobile device can also be called a system, a wireless terminal, a subscriber unit, a subscriber station, mobile station, mobile, remote station, access point, remote terminal, access terminal, user terminal, user agent, user device, or user equipment. A mobile device may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem.

A base station (e.g., access point) may refer to a device in an access network that communicates over the air-interface, through one or more sectors, with mobile devices. The base station may act as a router between the mobile device and the rest of the access network, which may include an IP network, by converting received air-interface frames to IP packets. The base station also coordinates management of attributes for the air interface.

Moreover, various aspects or features described herein, may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instructions) and/or data.

Referring now to FIG. 1, a wireless communication system 100 is illustrated in accordance with various embodiments presented herein. System 100 can comprise a base station 102 that receives, transmits, repeats, etc., wireless communication signals to mobile devices (e.g., mobile device 1 104, mobile device 2 106, mobile device N 108, where N may be substantially any integer). Further, it is contemplated that system 100 may include a plurality of base stations similar to base station 102. Although three mobile devices 104-108 are depicted, it is to be appreciated that system 100 may include substantially any number of mobile devices. Base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 102 may be a fixed station and/or mobile. Mobile device 1 104 (and similarly mobile device 2 106 and mobile device N 108) can be, for example, a cellular phone, a smart phone, a laptop, a handheld communication device, a handheld computing device, a satellite radio, a global positioning system, a PDA, and/or any other suitable device for communicating over wireless communication system 100. Also, mobile devices 104-108 may be fixed or mobile.

Each mobile device 104-108 may communicate with base station 102 (and/or disparate base station(s)) on a downlink and/or an uplink channel at any given moment. The downlink refers to the communication link from base station 102 to mobile device 104-108, and the uplink channel refers to the communication link from mobile device 104-108 to base station 102. Base station 102 may further communicate with other base station(s) and/or any disparate devices (e.g., servers) (not shown) that may perform functions such as, for example, authentication and authorization of mobile device 104-108, accounting, billing, and so on.

Base station 102 may include an uplink scheduler 110 that schedules uplink transmissions from mobile devices 104-108 to base station 102 (e.g., in an Orthogonal Frequency Division Multiplexing (OFDM) system). By way of illustration, an uplink may include a plurality of traffic channels (e.g., uplink traffic channels (ULTCHs)) at any number of time-frequency slots. Uplink scheduler 110 may assign a particular mobile device (e.g., mobile device 1 104) to a specified traffic channel and time-frequency slot, and a disparate mobile device (e.g., mobile device 2 106) to a differing traffic channel and/or time-frequency slot. Additionally, uplink scheduler 110 may select various parameters associated with assigned uplink transmissions. For example, assignments may provide information related to time, frequency, power, code rate, modulation, and the like that may be employed by mobile devices 104-108 in connection with assigned uplink transmissions. Further, uplink scheduler 110 may transmit uplink assignments over the downlink to respective mobile devices 104-108 (e.g., on a downlink traffic control channel (DLTCCH)).

Uplink scheduler 110 may include a user selector 112 and a rate selector 114. A user is any mobile device that has a connection with the Base Station and can be signaled an assignment on the downlink for uplink traffic. Since system 100 may include a plurality of mobile devices 104-108 (e.g., each with associated user(s)), user selector 112 enables choosing a particular mobile device (e.g., mobile device 2 106) from amongst the set of mobile devices 104-108 to assign to an uplink traffic channel during a time-frequency slot. For instance, user selector 112 may control fairness and take advantage of multi-user diversity in connection with allocating uplink access to mobile devices 104-108. According to an example, user selector 112 may leverage a token mechanism to control fairness. Pursuant to this example, a number of tokens may be distributed to differing users; the user selector 112 may assign a mobile based upon a current value of the tokens (e.g., which may be measured by various factors). Further, the user selector 112 may update the value of the tokens during substantially every slot based upon one or more of these factors. User selector 112 may evaluate the various factors related to mobile devices 104-108 in connection with allotting time-frequency slots (e.g., traffic channels) for transmission on uplink traffic channels (e.g., based on the updated token values); the factors corresponding to each of the mobile devices 104-108 may be, for example, an interference cost (e.g., Beacon ratio report, path loss report, . . . ), a traffic priority, a maximum available power, an amount of time since a mobile was previously assigned, a quality of service (QoS) class, and the like. It is contemplated that any number of these factors may be utilized in any manner to yield the token values.

Moreover, upon user selector 112 apportioning an uplink traffic channel and time-frequency slot to a particular mobile device (e.g., mobile device 2 106), rate selector 114 may assign a rate (e.g., code rate) to be employed for the uplink transmission on the traffic channel during the time-frequency slot. Rate selector 114 may control the selected user (e.g., selected mobile device, mobile device 2 106, . . . ) to utilize rates that may optimize, without instabilizing, system 100. For example, rate selector 114 may determine the rate for uplink transmission based upon an interference cost (e.g., Beacon ratio report, path loss report, . . . ) associated with the selected mobile device (e.g., mobile device 2 106), a maximum available power of the selected mobile device, and/or QoS data. According to another example, rate selector 114 may determine a power (e.g., nominal power) to be utilized for the uplink transmission on the traffic channel during the time-frequency slot (e.g., based upon the interference cost, maximum available power of the selected mobile device, QoS data, . . . ).

Figure 2:
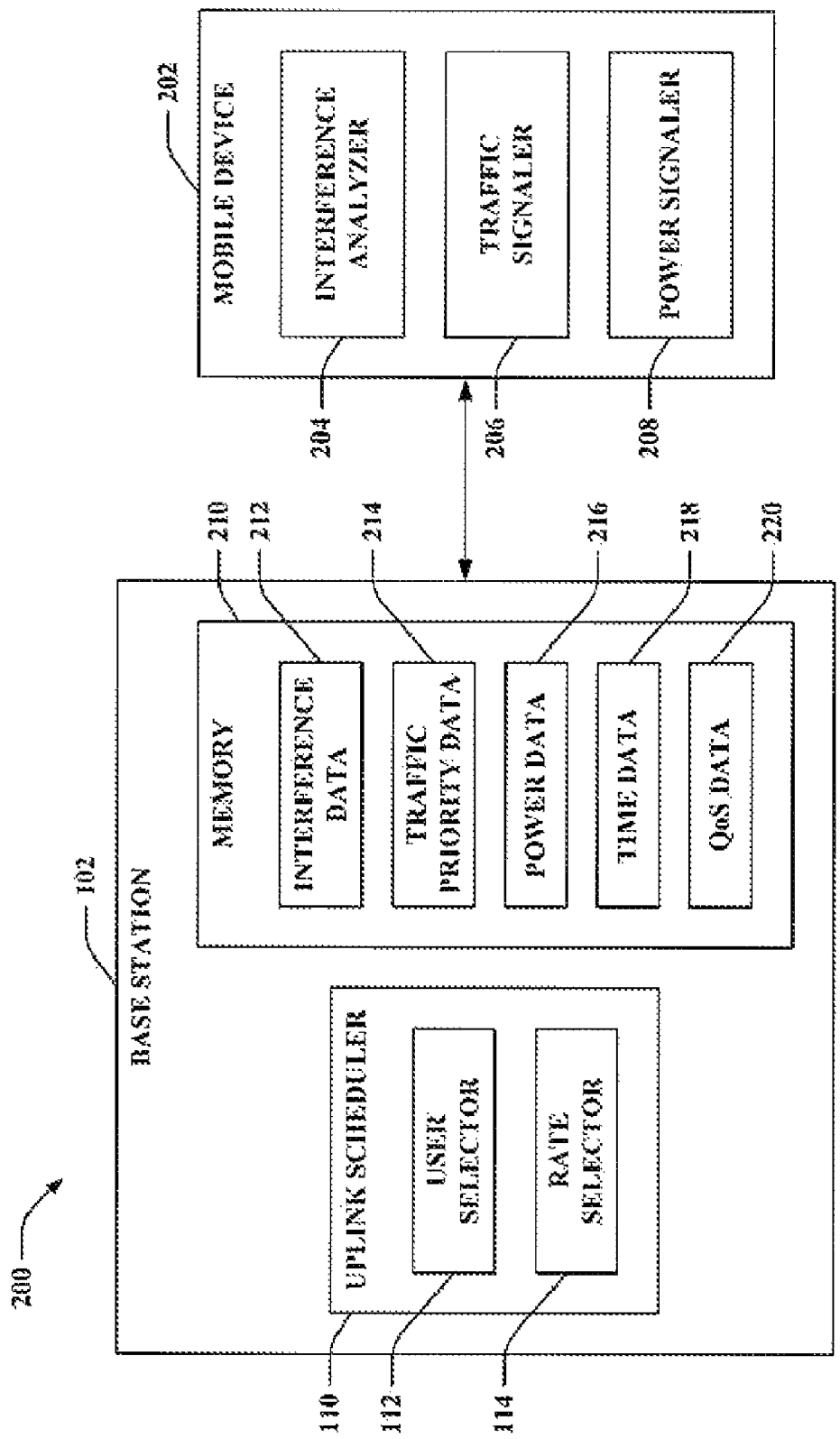
FIG. 2 is an illustration of an example system that signals information on an uplink to enable selecting users and/or rates for uplink scheduling.

Now turning to FIG. 2, illustrated is a system 200 that signals information on an uplink to enable selecting users and/or rates for uplink scheduling. System 200 includes base station 102 that communicates with a mobile device 202 (e.g., one of mobile devices 104-108) and/or any number of disparate mobile devices (not shown). Base station may include uplink scheduler 110, which may further comprise user selector 112 and rate selector 114 that allocate access to uplink traffic channels and control rates utilized upon such uplink traffic channels, respectively.

Mobile device 202 may include an interference analyzer 204 that may evaluate an interference cost at mobile device 202 (e.g., by employing substantially any technique). For instance, the interference cost determined by interference analyzer 204 may be a Beacon ratio report, a path loss report, and so forth. Further, interference analyzer 204 may signal the interference cost measured at mobile device 202 to base station 102 on the uplink.

By way of example, mobile device 202 may be connected to base station 102, and signals transmitted between base station 102 and mobile device 202 may be subject to a first path gain, $G_1$. Further, signals transferred between a disparate base station (not shown) and mobile device 202 may be subject to a second path gain, $G_2$. According to an illustration, interference analyzer 204 may determine the interference cost, α, by evaluating $$\alpha = \frac{G_2}{G_1}.$$

For instance, if α is close to zero, mobile device 202 may be in close proximity to base station 102 and relatively far from the disparate base station, and if α is close to one, the distance to base station 102 from mobile device 202 may be more similar to the distance to the disparate base station from mobile device 202.

Pursuant to another illustration, any number of base stations may be employed in system 200; thus, interference analyzer 204 may calculate the interference cost as $$\alpha = \frac{\sum_i G_i}{G_0}, \text{ where } \sum_i G_i$$

may be the sum of path gains (e.g., corresponding to disparate base stations (not shown)) and $G_0$ may be the path gain between base station 102 and mobile device 202. In accordance with a further example, base station 102 and disparate base station(s) (not shown) may transmit respective loading factors, s; therefore, interference analyzer 204 may determine the interference cost as a function of loading factors, such as, by evaluating $$\alpha = \frac{\sum_i s_i G_i}{s_0 G_0}.$$

By way of another example, Beacon signals transmitted by base station 102 and disparate base stations may be obtained by mobile device 202, and interference analyzer 204 may generate a Beacon ratio report. It is contemplated that any manner of determining the interference cost known by both base station 102 and mobile device 202 may be utilized in connection with the claimed subject matter. Further, interference analyzer 204 (and/or mobile device 202) may signal the measured interference cost to base station 102 for utilization by uplink scheduler 110.

Additionally, mobile device 202 may include a traffic signaler 206 and a power signaler 208. Traffic signaler 206 may send traffic priority information to base station 102. For example, the traffic priority information may be associated with an importance of data to be transmitted by mobile device 202 over the uplink, a type of such data, an amount of the data, delay experienced by that data thus far in the queue, and so forth. Further, power signaler 208 sends information related to a maximum available power that may be employed by mobile device 202 for transmission (e.g., over the uplink) to base station 102.

Base station 102 may further include memory 210 that may retain data, which may be utilized by user selector 112 and/or rate selector 114. Memory 210 may store data generated by base station 102, received from mobile device 202 (and/or disparate mobile devices), obtained from a server, and so forth. For example, memory 210 may retain interference data 212, traffic priority data 214, power data 216, time data 218, and/or QoS data 220, each of which may include data associated with a plurality of mobile devices (e.g., including mobile device 202). Interference data 212 may be the interference cost information obtained from interference analyzer 204. Moreover, traffic priority data 214 and power data 216 may be similarly received from mobile device 202 via traffic signaler 206 and power signaler 208, respectively. Additionally, time data 218 may be information related to a time since a last assignment for mobile device(s) (e.g., mobile device 202). QoS data 220 may be quality of service (QoS) classes associated with users (e.g., mobile devices); for example, QoS classes may be defined by an amount paid for service (e.g., higher subscription fee collected for a QoS class that provides a higher level of access to uplink channels).

According to an example, user selector 112 may employ interference data 212, traffic priority data 214, power data 216, time data 218, and QoS data 220 in connection with assigning uplink traffic channels to mobile devices (e.g., mobile device 202). Pursuant to another example, rate selector 114 may utilize interference data 212, power data 216, and QoS data 220 to determine a code rate to be employed by the assigned mobile devices. Further to this example, a higher QoS class as noted in QoS data 220 can lead to higher rate allocation by rate selector 114 for substantially similar interference data 212 if power data 216 specifies that the rate is supportable. It is to be appreciated, however, that the claimed subject matter is not limited to the foregoing examples. Thereafter, base station 102 may transfer uplink assignments (e.g., that may include the selected rates) to mobile device 202 and/or disparate mobile devices.

Figure 3:
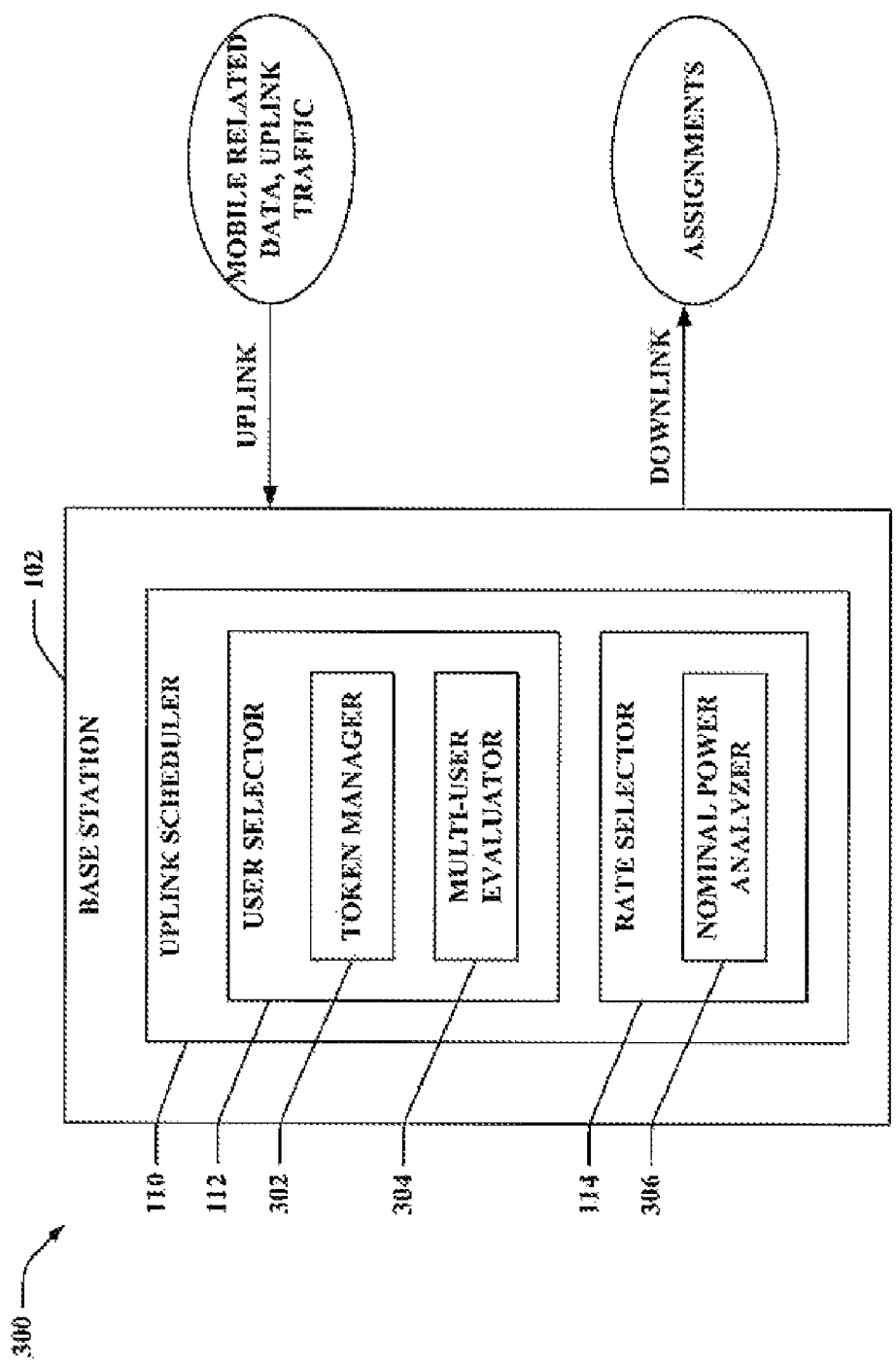
FIG. 3 is an illustration of an example system that schedules uplink transmissions in a wireless communication environment.

With reference to FIG. 3, illustrated is a system 300 that schedules uplink transmissions in a wireless communication environment. System 300 includes base station 102 that receives mobile related data (e.g., interference costs, traffic priority reports, maximum power availability reports, . . . ) signaled over an uplink. Base station 102 may include uplink scheduler 110 that generates assignments by employing user selector 112 and rate selector 114, and assignments may be sent on a downlink. Further, in response to the assignments, base station 102 may obtain uplink traffic (e.g., at assigned times, frequencies, code rates, modulation schemes, . . . ).

User selector 112 enables uplink scheduling with user selection based on user metrics where the user metrics may be based on token allocation (e.g., resulting in a token metric) and a multitude of factors (e.g., QoS, time since last assignment, interference report, traffic priority, power, . . . ). User selector 112 may further comprise a token manager 302 and a multi-user evaluator 304. Both token manager 302 and multi-user evaluator 304 may contribute to part of a user metric for user selection. At each time-frequency slot, users may be chosen by user selector 112 based upon $$i^* = \underset{i \in U}{\operatorname{argmax}} Metric_i,$$

where U is a set of schedulable users at a particular time-frequency slot and $Metric_i$ is a total metric of a user i. The total metric of a user is evaluated on a per user basis by user selector 112 as Metric=TokenMetric+UserSpecificMetric. For example, the total metric may be computed as follows: Metric=TokenMetric+MudMetric. Token manager 302 may yield TokenMetric and multi-user evaluator 304 may generate MudMetric (e.g., which may be a metric exploiting multi-user diversity). Additionally or alternatively, multi-user evaluator 304 may provide any disparate user specific metrics such as a PathLossMetric as described below; thus, where multi-user evaluator 304 generates MudMetric and PathLossMetric, UserSpecificMetric=MudMetric+PathLossMetric. Moreover, token manager 302 may utilize substantially similar calculations based upon substantially similar parameters for a class of users to generate TokenMetric. Additionally, token manager 302 may update TokenMetric simultaneously for users in a common class. Further, multi-user evaluator 304 may employ user specific parameters to obtain MudMetric and/or PathLossMetric.

Token manager 302 may track historical data to determine an overall number of times a user has been assigned to use the channel. Further, token manager 302 may generate a fairness metric (TokenMetric) that may be provided to enhance user selector 112. Moreover, token manager 302 may update the token of a user as follows: Token(t+1)=Token(t)+ulTokenUpdateRate−ulAsgFlag(t)*ulWtTxFrms, where ulTokenUpdateRate may be determined by a service class (e.g., QoS data) of the user. For example, ulTokenUpdateRate may be 64 for best-effort users and 128 for delay-sensitive users; however, the claimed subject matter is not so limited. Further, ulAsgFlag(t) may be the recorded number of segments the user is assigned to in time-frequency slot t (e.g., ulAsgFlag(t) ∈ {0,1, 2}). Additionally, ulWtTxFrms may determine the amount of token reduction when a user is scheduled; for example, ulWtTxFrms may be chosen by token manager 302 to make the token algorithm unbiased in the sense that token drift in the long run may be approximately zero. Hence, token manager 302 may evaluate ulWtTxFrms=ulTokenUpdateRate*|U|*8/11. For example, the constant term 8/11 may be based upon an uplink segment alignment with 11 segments in 8 slots; however, any number of segments and/or slots may be utilized. Additionally, token manager 302 may utilize a hard limit for the maximum and minimum token allowed. Moreover, token manager 302 may effectuate a period macro token update algorithm to keep the average token in each sector server unchanged over time. The TokenMetric of a user may be determined by token manager 302 as TokenMetric=Token*ulTokenWt, where ulTokenWt may be 0.01, according to an example.

Multi-user evaluator 304 may enable channel conditions to be considered in connection with uplink scheduling. According to an example, multi-user evaluator 304 may utilize a DCCH backoff report to represent, the uplink channel condition. DCCH backoff is controlled by a close-loop uplink power control mechanism. Pursuant to another illustration, multi-user evaluator 304 may represent the uplink channel quality based upon an instantaneous path loss ratio or a path loss ratio available during beacon slots. In accordance with a further example, multi-user evaluator 304 may utilize a downlink signal-to-noise (SNR) report to represent the uplink channel quality (e.g., for the single uplink receive antenna case assuming full symmetry between uplink and downlink channels).

Moreover, multi-user evaluator 304 may analyze a remaining power at each mobile. For example, assuming that there are two users, one with good channel quality but only enough power to support the lowest rate option (e.g., since this user has been assigned a couple of TCH segments in flight), while a second user has a diminished channel quality in comparison but enough power to support a much higher rate option, multi-user evaluator 304 may schedule the second user rather than the first user. Multi-user evaluator 304 may utilize an available DCCH backoff to represent the remaining power level, which may be calculated on a per-user basis as:

$$AvailBackoff = \min\left(10\log_{10}\left(\frac{PowerAvail}{PowerDcch}\right), AvailBackoff_{max}\right).$$

Note here that the available backoff is hard limited by a ceiling, $AvailBackoff_{max}$=10 $\log_{10}$(PowerTch(MaxRateOption)*MaxNumTonesAvail/PowerDcch), which mitigates placing too much priority on users with more than necessary remaining power. Further, PowerTch(MaxRateOption) may be a power required for a maximum rate option.

Multi-user evaluator 304 may generate the multi-user metric for a user based upon the following:

MudMetric=((1−*ul*BackoffWt)*AvailBackoff+*ul*BackoffWt*(*Dcch*Backoff−*Dcch*BackoffAverage))*BackoffScale.

Accordingly, BackoffScale may be 10.0. Further, ulBackoffWt may be utilized to control fairness of uplink scheduler 110 among users. When ulBackoffWt approaches 1, users will get a substantially similar number of assigned segments, and when ulBackoffWt becomes smaller, more priority may be given to users with good channel quality. According to an example, 0.75 may be utilized as a moderate scheduler setting of ulBackoffWt and 0.10 may be an aggressive scheduler setting. Moreover, DcchBackOff may be determined as follows:

$$DcchBackOff = 10\log_{10}\left(\frac{MaxPowerAllowed}{PowerDcch}\right).$$

Further, DcchBackOffAverage may be an average of DcchBackOff over the last n slots where n may be 700, for instance (e.g., 1 sec averaging). Also, MaxPowerAllowed may be a maximum total power a user is allowed to transmit and PowerDcch may be a current DCCH transmission power.

According to another example, multi-user evaluator 304 may consider an interference caused by each user as an additional metric (e.g., PathLossMetric). PathLossMetric yielded by multi-user evaluator 304 may be another user specific metric similar to the MudMetric. Assuming other conditions remain constant, users that cause less interference to other cells may be scheduled rather than users that cause greater amounts of such interference. According to an example, the average path loss ratio, the instantaneous path loss ratio and/or the downlink SNR can be used to capture this effect of inter-cell interference. For instance, multi-user evaluator 304 may utilize the average path loss ratio and the PathLossMetric may be calculated on a per user basis as: PathLossMetric=PathLossRatio*PathLossScale*PathLossWt, where PathLossScale may be 32 and PathLossWt may be 1; however, the claimed subject matter is not so limited.

Upon user selector 112 assigning a user to a traffic channel, rate selector 114 may assign a code rate. Rate selector 114 may include a nominal power analyzer 306 that enables determining a nominal power, $P_{nom}$. Nominal power analyzer 306 may generate $P_{nom}$ based upon an interference measurement. For example, nominal power analyzer 306 may evaluate $P_{nom}=\beta 1$, where $\beta$ is related to a loading factor (e.g., $\beta<1$) and I is an interference measured by base station 102 on a per tone basis.

Rate selector 114 may thereafter analyze $$P = \min\left(\frac{1}{\alpha}P_{nom}, P_{max}\right),$$

where $\alpha$ is an interference cost (e.g., signaled by a mobile device) and $P_{max}$ is a maximum transmit power, to determine a power that can be utilized for uplink transmission. Based upon P, rate selector 114 may calculate a signal-to-noise ratio, $$SNR = \frac{P}{I},$$

which may map to a rate. Thus, rate selector 114 may determine the rate, R, to be utilized by the mobile device by evaluating $R=\log(1+SNR)$. The rate may thereafter be incorporated into an assignment sent to a mobile device over the downlink.

The following provides further examples related to rate selection. The set of users allocated on traffic channels that share the same time slot may have their rates, r(i), chosen. Multiple traffic channels can share the same time slot. A given traffic channel can have one user selected through the user selection part (e.g., user selector 112). When the user comes up for rate allocation, rates allocated to users in other traffic channels that have already been scheduled and share the same time slot may be evaluated. For example, the nominal power yielded by nominal power analyzer 306 may be altered based upon considerations related to users scheduled in other traffic channels. Further to this example, power allocated to the other traffic channels sharing the same time slot may be subtracted out and the remaining $P_{nom}$ may be utilized for the rate calculation as described above. If more than one traffic channel has come up for scheduling in the time slot, then the rate allocation on both the traffic channels may be jointly evaluated. For instance, if two traffic channels are to be scheduled in a time slot, rate selector 114 yields two rates, where an evaluation of the rates may be effectuated jointly in that the available $P_{nom}$ may be split in an appropriate manner between two users. According to the foregoing and providing further illustration, the following rate selection criterion (e.g., which may provide a bound to the total interference generated by mobiles inside the same sector server) may be utilized:

$$\sum_{i:\,UsersTransmittingDcch} r_i * \gamma_0 +$$

$$\sum_{i:\,UsersAssignedOnTrafficChannelsSharingCurrentTimeSlot} r_i * \beta(r(i)) N_t(i) \leq N_{data},$$

where $r_i$ may be a pathloss ratio and/or interference cost. For clarity sake, lets mention that 'i' is an index into a set of mobile terminals. Additionally, $\gamma_0$ may be a targeted dcch snr, $N_t(i)$ may be a number of tones in a particular traffic channel that have come up for allocation, and $N_{data}$ may be a number of data tones in the OFDM system. Further, $$\beta(r(i)) = \frac{PowerTch(r(i))}{PowerDcch}.$$

To allocate the interference budget among different traffic channels, uplink scheduler 110 may consider the following factors: the spectral efficiency of the overall system, traffic requests sent by the terminal, the interference budget remaining and user QoS class. A baseline mechanism may be that the interference budget is proportional to the number of tones in the traffic channel coming up for rate assignment. Further, uplink scheduler 110 may choose to offset the interference budget based on the factors mentioned above, which allow the mobiles using corresponding traffic channels to deviate from the baseline interference budget.

Figure 4:
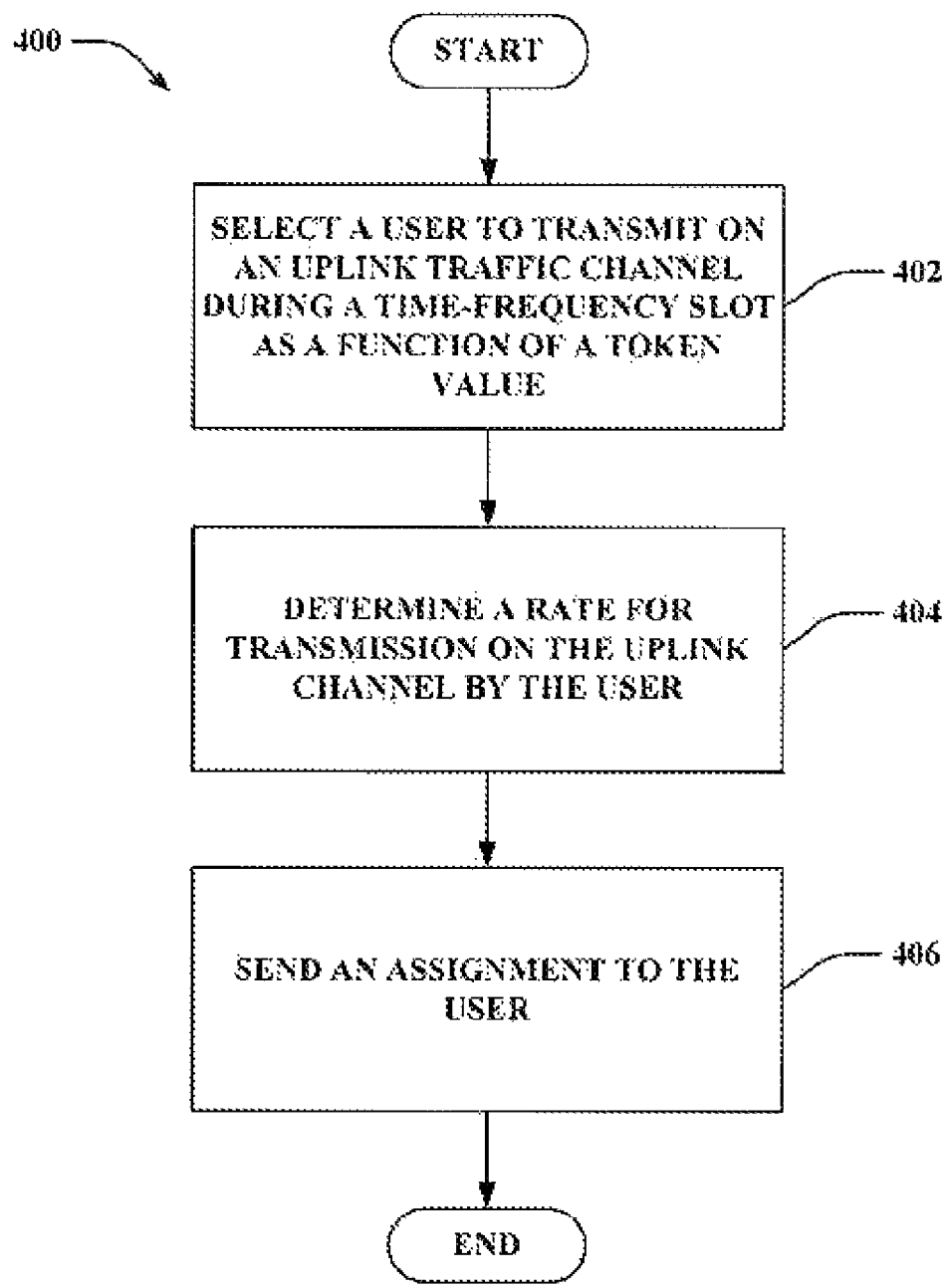
FIG. 4 is an illustration of an example methodology that facilitates uplink scheduling in an OFDM environment.
Figure 5:
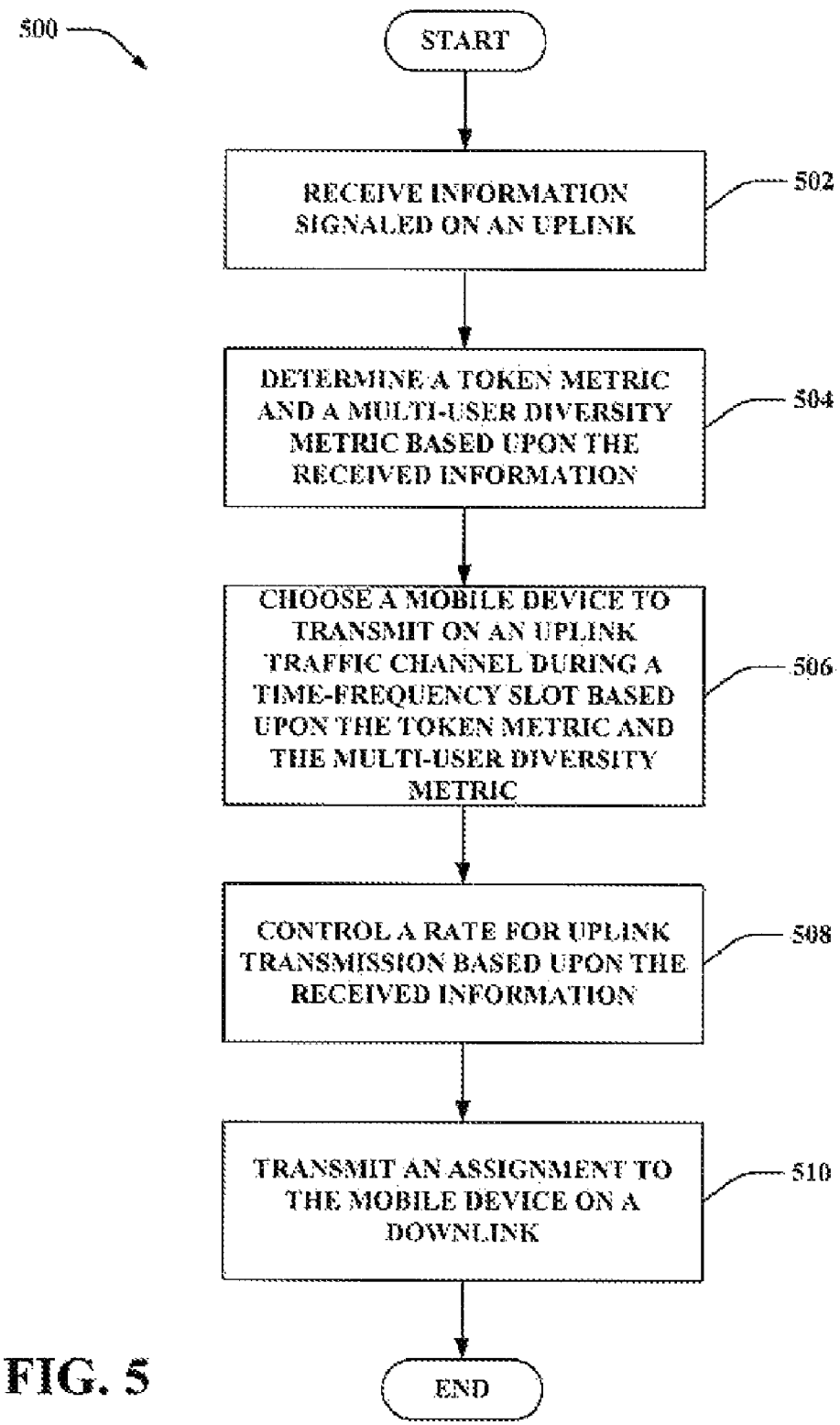
FIG. 5 is an illustration of an example methodology that facilitates scheduling uplink transmissions by utilizing information obtained from mobile devices.
Figure 6:
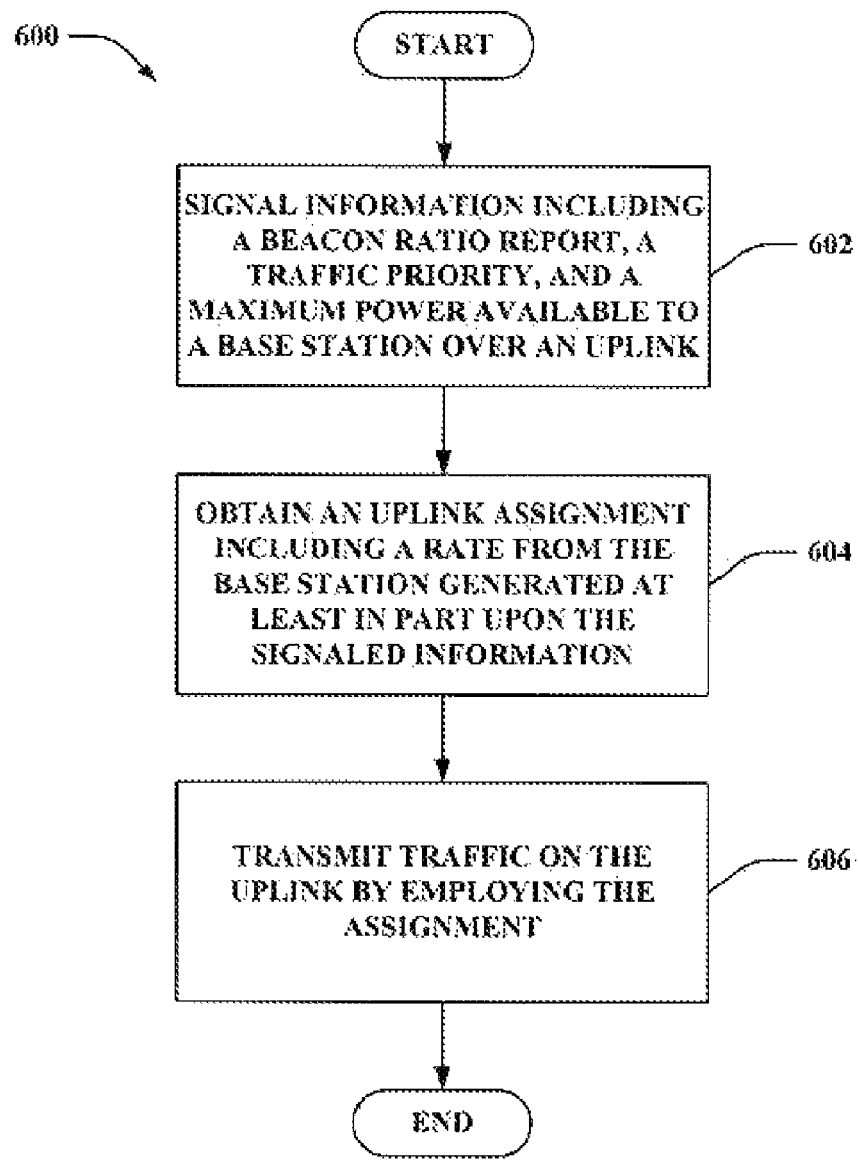
FIG. 6 is an illustration of an example methodology that facilitates signaling information over an uplink in connection with obtaining a scheduled assignment for transmission over the uplink.

Referring to FIGS. 4-6, methodologies relating to uplink scheduling in OFDM systems are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is a methodology 400 that facilitates uplink scheduling in an OFDM environment. At 402, a user may be selected to transmit on an uplink traffic channel during a time-frequency slot as a function of a token value. For example, a number of tokens may be distributed to various users, and as uplink assignments are made to the users, some number of tokens may be subtracted from a total associated with each of the users. Moreover, current token values from a plurality of users may be analyzed and a particular user may be selected according to this analysis. Additionally or alternatively, a number of tokens remaining for a particular user may be measured by an interference cost, a traffic priority, a maximum power available for transmission by the user, and/or a time from a last assignment to the user. According to another example, QoS classes may be considered when analyzing a number of tokens associated with users. At 404, a rate for transmission on the uplink channel by the user may be determined. By way of illustration, the rate may be selected to mitigate interference. Further, the rate may be selected as a function of an interference cost and/or a maximum power available for transmission by the user. At 406, an assignment may be sent to the user. For example, the assignment may include information related to time, frequency, rate, modulation, and so forth, which may be utilized for transmission over an uplink.

Now referring to FIG. 5, illustrated is a methodology 500 that facilitates scheduling uplink transmissions by utilizing information obtained from mobile devices. At 502, information signaled on an uplink may be received. For example, the information may include interference costs measured by mobile devices (e.g., Beacon ratio report, path loss report, . . . ), traffic priorities, and/or maximum power available at mobile devices for transmission. At 504, a token metric and a multi-user diversity metric may be determined based upon the received information. Additionally or alternatively, the token metric and the multi-user diversity metric may be evaluated based upon data related to a time since a previous assignment to a mobile device and/or QoS classes of users. At 506, a mobile device may be chosen to transmit on an uplink traffic channel during a time-frequency slot based upon the token metric and the multi-user diversity metric. For example, a user with a largest combination of the two metrics may be selected. At 508, a rate for uplink transmission may be controlled based upon the received information. Thus, for the chosen mobile device, the interference cost and/or the maximum power available may be considered in connection with selecting the rate. By way of example, a nominal power may be obtained. Thereafter, a transmission power may be selected by evaluating $$P = \min\left(\frac{1}{\alpha} P_{nom}, P_{max}\right),$$

where $\alpha$ is the interference cost and $P_{max}$ is a maximum power available. Further, a SNR may be calculated by dividing the transmission power, P, by a per tone interference measured at a base station. Moreover, the rate may map to the SNR, and may be obtained by analyzing R=log(1+SNR). At 310, an assignment may be transmitted to the mobile device on a downlink.

With reference to FIG. 6, illustrated is a methodology 600 that facilitates signaling information over an uplink in connection with obtaining a scheduled assignment for transmission over the uplink. At 602, information including a Beacon ratio report, a traffic priority, and a maximum power available may be signaled to a base station over an uplink. According to an example, the information may be sent as part of a request; however, the claimed subject matter is not so limited. At 604, an uplink assignment including a rate may be obtained from the base station, where the assignment may be generated at least in part based upon the signaled information. For example, the signaled information may be employed by the base station to determine a token metric and/or a multi-user diversity metric. Further, the base station may consider such metrics in connection with yielding the assignment. At 606, traffic may be transmitted on the uplink by employing the assignment. Thus, uplink transmission may be effectuated at a frequency, time, rate, etc. specified in the assignment.

It will be appreciated that, in accordance with one or more aspects described herein, inferences can be made regarding selecting users and/or rates in connection with scheduling uplink transmission. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding analyzing an interference cost associated with uplink transmission; the inferred interference cost may be signaled to a base station to enable uplink scheduling. By way of further illustration, an inference may be made related to a priority of data to be transmitted via an uplink traffic channel, and the inferred priority may be employed in connection with selecting users for uplink assignments. It will be appreciated that the foregoing examples are illustrative in nature and are not intended to limit the number of inferences that can be made or the manner in which such inferences are made in conjunction with the various embodiments and/or methods described herein.

Figure 7:
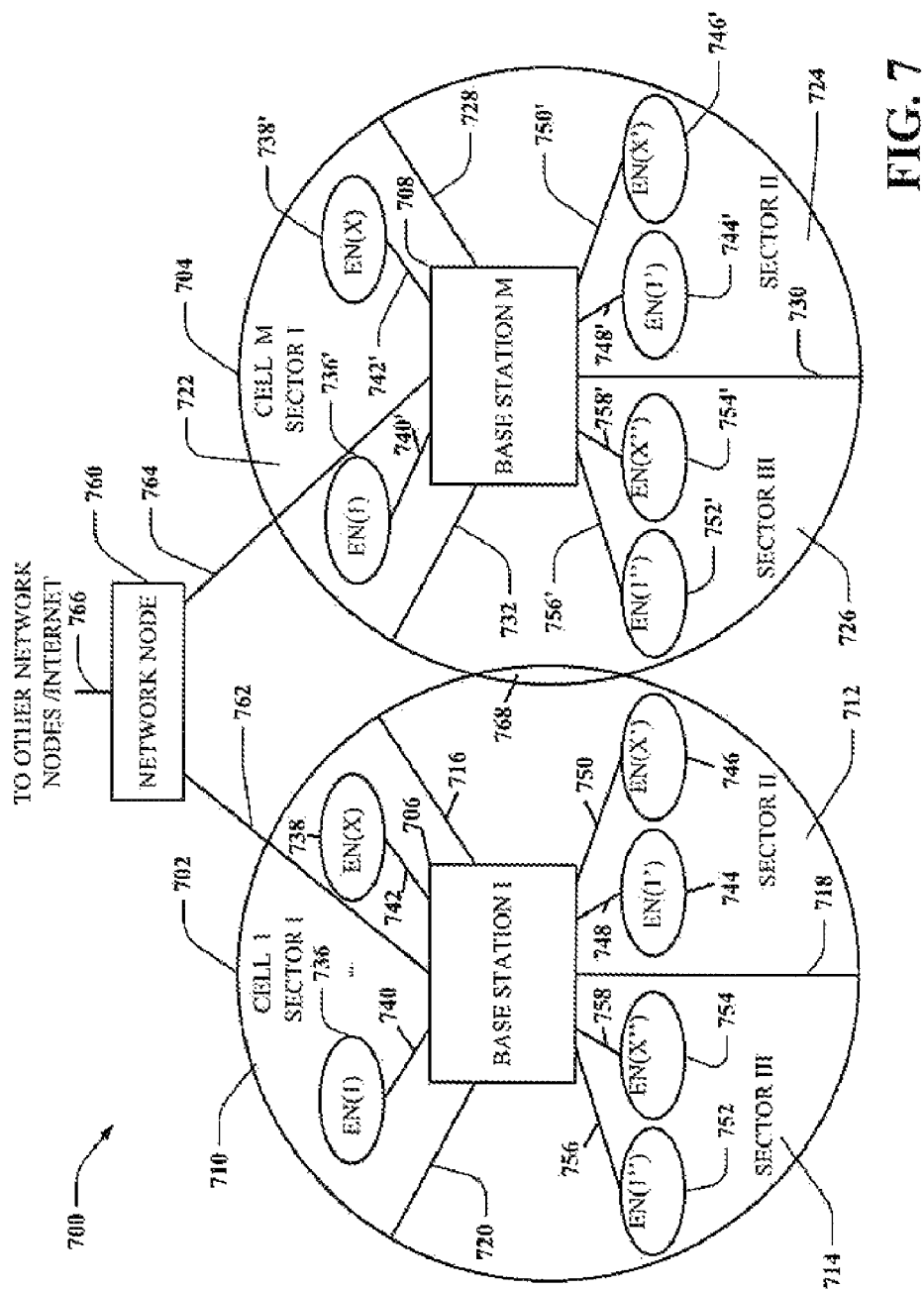
FIG. 7 is an illustration of an example communication system implemented in accordance with various aspects including multiple cells.

FIG. 7 depicts an example communication system 700 implemented in accordance with various aspects including multiple cells: cell I 702, cell M 704. Note that neighboring cells 702, 704 overlap slightly, as indicated by cell boundary region 768, thereby creating potential for signal interference between signals transmitted by base stations in neighboring cells. Each cell 702, 704 of system 700 includes three sectors. Cells which have not be subdivided into multiple sectors (N=1), cells with two sectors (N=2) and cells with more than 3 sectors (N>3) are also possible in accordance with various aspects. Cell 702 includes a first sector, sector I 710, a second sector, sector II 712, and a third sector, sector III 714. Each sector 710, 712, 714 has two sector boundary regions; each boundary region is shared between two adjacent sectors.

Sector boundary regions provide potential for signal interference between signals transmitted by base stations in neighboring sectors. Line 716 represents a sector boundary region between sector I 710 and sector II 712; line 718 represents a sector boundary region between sector II 712 and sector III 714; line 720 represents a sector boundary region between sector III 714 and sector I 710. Similarly, cell M 704 includes a first sector, sector I 722, a second sector, sector II 724, and a third sector, sector III 726. Line 728 represents a sector boundary region between sector I 722 and sector II 724; line 730 represents a sector boundary region between sector II 724 and sector III 726; line 732 represents a boundary region between sector III 726 and sector I 722. Cell I 702 includes a base station (BS), base station I 706, and a plurality of end nodes (ENs) (e.g., mobile devices) in each sector 710, 712, 714. Sector I 710 includes EN(1) 736 and EN(X) 738 coupled to BS 706 via wireless links 740, 742, respectively; sector II 712 includes EN(1') 744 and EN(X') 746 coupled to BS 706 via wireless links 748, 750, respectively; sector III 714 includes EN(1") 752 and EN(X") 754 coupled to BS 706 via wireless links 756, 758, respectively. Similarly, cell M 704 includes base station M 708, and a plurality of end nodes (ENs) in each sector 722, 724, 726. Sector I 722 includes EN(1) 736' and EN(X) 738' coupled to BS M 708 via wireless links 740', 742', respectively; sector II 724 includes EN(1') 744' and EN(X') 746' coupled to BS M 708 via wireless links 748', 750', respectively; sector 3 726 includes EN(1") 752' and EN(X") 754' coupled to BS 708 via wireless links 756', 758', respectively.

System 700 also includes a network node 760 which is coupled to BS I 706 and BS M 708 via network links 762, 764, respectively. Network node 760 is also coupled to other network nodes, e.g., other base stations, AAA server nodes, intermediate nodes, routers, etc. and the Internet via network link 766. Network links 762, 764, 766 may be, e.g., fiber optic cables. Each end node, e.g., EN(1) 736 may be a wireless terminal including a transmitter as well as a receiver. The wireless terminals, e.g., EN(1) 736 may move through system 700 and may communicate via wireless links with the base station in the cell in which the EN is currently located. The wireless terminals, (WTs), e.g., EN(1) 736, may communicate with peer nodes, e.g., other WTs in system 700 or outside system 700 via a base station, e.g., BS 706, and/or network node 760. WTs, e.g., EN(1) 736 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Figure 8:
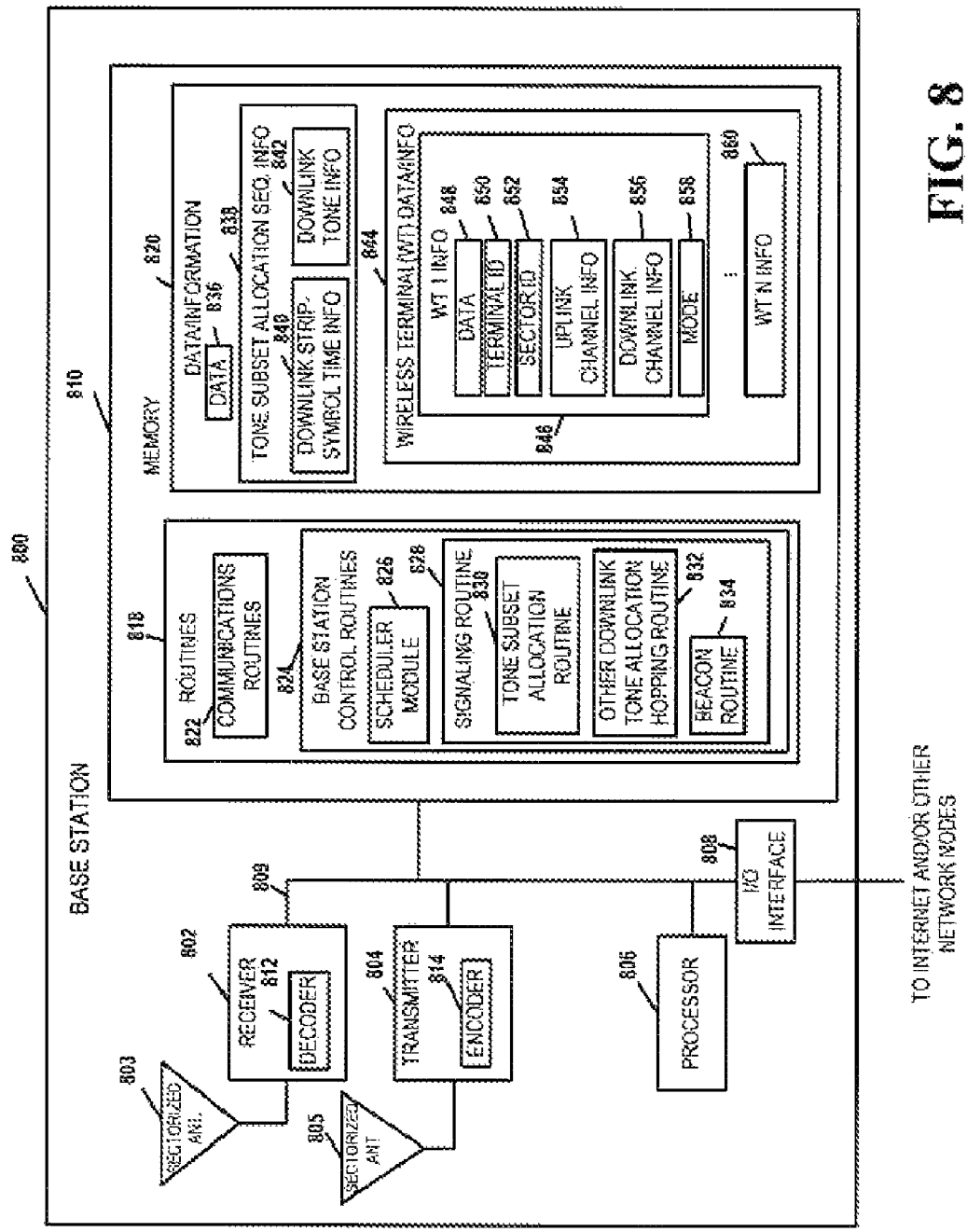
FIG. 8 is an illustration of an example base station in accordance with various aspects.

FIG. 8 illustrates an example base station 800 in accordance with various aspects. Base station 800 implements tone subset allocation sequences, with different tone subset allocation sequences generated for respective different sector types of the cell. Base station 800 may be used as any one of base stations 706, 708 of the system 700 of FIG. 7. The base station 800 includes a receiver 802, a transmitter 804, a processor 806, e.g., CPU, an input/output interface 808 and memory 810 coupled together by a bus 809 over which various elements 802, 804, 806, 808, and 810 may interchange data and information.

Sectorized antenna 803 coupled to receiver 802 is used for receiving data and other signals, e.g., channel reports, from wireless terminals transmissions from each sector within the base station's cell. Sectorized antenna 805 coupled to transmitter 804 is used for transmitting data and other signals, e.g., control signals, pilot signal, beacon signals, etc. to wireless terminals 900 (see FIG. 9) within each sector of the base station's cell. In various aspects, base station 800 may employ multiple receivers 802 and multiple transmitters 804, e.g., an individual receiver 802 for each sector and an individual transmitter 804 for each sector. Processor 806, may be, e.g., a general purpose central processing unit (CPU). Processor 806 controls operation of base station 800 under direction of one or more routines 818 stored in memory 810 and implements the methods. I/O interface 808 provides a connection to other network nodes, coupling the BS 800 to other base stations, access routers, AAA server nodes, etc., other networks, and the Internet. Memory 810 includes routines 818 and data/information 820.

Data/information 820 includes data 836, tone subset allocation sequence information 838 including downlink strip-symbol time information 840 and downlink tone information 842, and wireless terminal (WT) data/info 844 including a plurality of sets of WT information: WT 1 info 846 and WT N info 860. Each set of WT info, e.g., WT 1 info 846 includes data 848, terminal ID 850, sector ID 852, uplink channel information 854, downlink channel information 856, and mode information 858.

Routines 818 include communications routines 822 and base station control routines 824. Base station-control routines 824 includes a scheduler module 826 and signaling routines 828 including a tone subset allocation routine 830 for strip-symbol periods, other downlink tone allocation hopping routine 832 for the rest of symbol periods, e.g., non strip-symbol periods, and a beacon routine 834.

Data 836 includes data to be transmitted that will be sent to encoder 814 of transmitter 804 for encoding prior to transmission to WTs, and received data from WTs that has been processed through-decoder 812 of receiver 802 following reception. Downlink strip-symbol time information 840 includes the frame synchronization structure information, such as the super slot, beaconslot, and ultraslot structure information and information specifying whether a given symbol period is a strip-symbol period, and if so, the index of the strip-symbol period and whether the strip-symbol is a rescuing point to truncate the tone subset allocation sequence used by the base station. Downlink tone information 842 includes information including a carrier frequency assigned to the base station 800, the number and frequency of tones, and the set of tone subsets to be allocated to the strip-symbol periods, and other cell and sector specific values such as slope, slope index and sector type.

Data 848 may include data that WT1 900 has received from a peer node, data that WT 1 900 desires to be transmitted to a peer node, and downlink channel quality report feedback information. Terminal ID 850 is a base station 800 assigned ID that identifies WT 1 900. Sector ID 852 includes information identifying the sector in which WT1 900 is operating. Sector ID 852 can be used, for example, to determine the sector type. Uplink channel information 854 includes information identifying channel segments that have been allocated by scheduler 826 for WT1 900 to use, e.g., uplink traffic channel segments for data, dedicated uplink-control channels for requests, power control, timing control, etc. Each uplink channel assigned to WT1 900 includes one or more logical tones, each logical tone following an uplink hopping sequence. Downlink channel information 856 includes information identifying channel segments that have been allocated by scheduler 826 to carry data and/or information to WT1 900, e.g., downlink traffic channel segments for user data. Each downlink channel assigned to WT1 900 includes one or more logical tones, each following a downlink hopping sequence. Mode information 858 includes information identifying the state of operation of WT1 900, e.g. sleep, hold, on.

Communications routines 822 control the base station 800 to perform various communications operations and implement various communications protocols. Base station control routines 824 are used to control the base station 800 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 828 controls the operation of receiver 802 with its decoder 812 and transmitter 804 with its encoder 814. The signaling routine 828 is responsible for controlling the generation of transmitted data 836 and control information. Tone subset allocation routine 830 constructs the tone subset to be used in a strip-symbol period using the method of the aspect and using data/information 820 including downlink strip-symbol time info 840 and sector ID 852. The downlink tone subset allocation sequences will be different for each sector type in a cell and different for adjacent cells. The WTs 900 receive the signals in the strip-symbol periods in accordance with the downlink tone subset allocation sequences; the base station 800 uses the same downlink tone subset allocation sequences in order to generate the transmitted signals. Other downlink tone allocation hopping routine 832 constructs downlink tone hopping sequences, using information including downlink tone information 842, and downlink channel information 856, for the symbol periods other than the strip-symbol periods. The downlink data tone hopping sequences are synchronized across the sectors of a cell. Beacon routine 834 controls the transmission of a beacon signal, e.g., a signal of relatively high power signal concentrated on one or a few tones, which may be used for sychronization purposes, e.g., to synchronize the frame timing structure of the downlink signal and therefore the tone subset allocation sequence with respect to an ultra-slot boundary.

Figure 9:
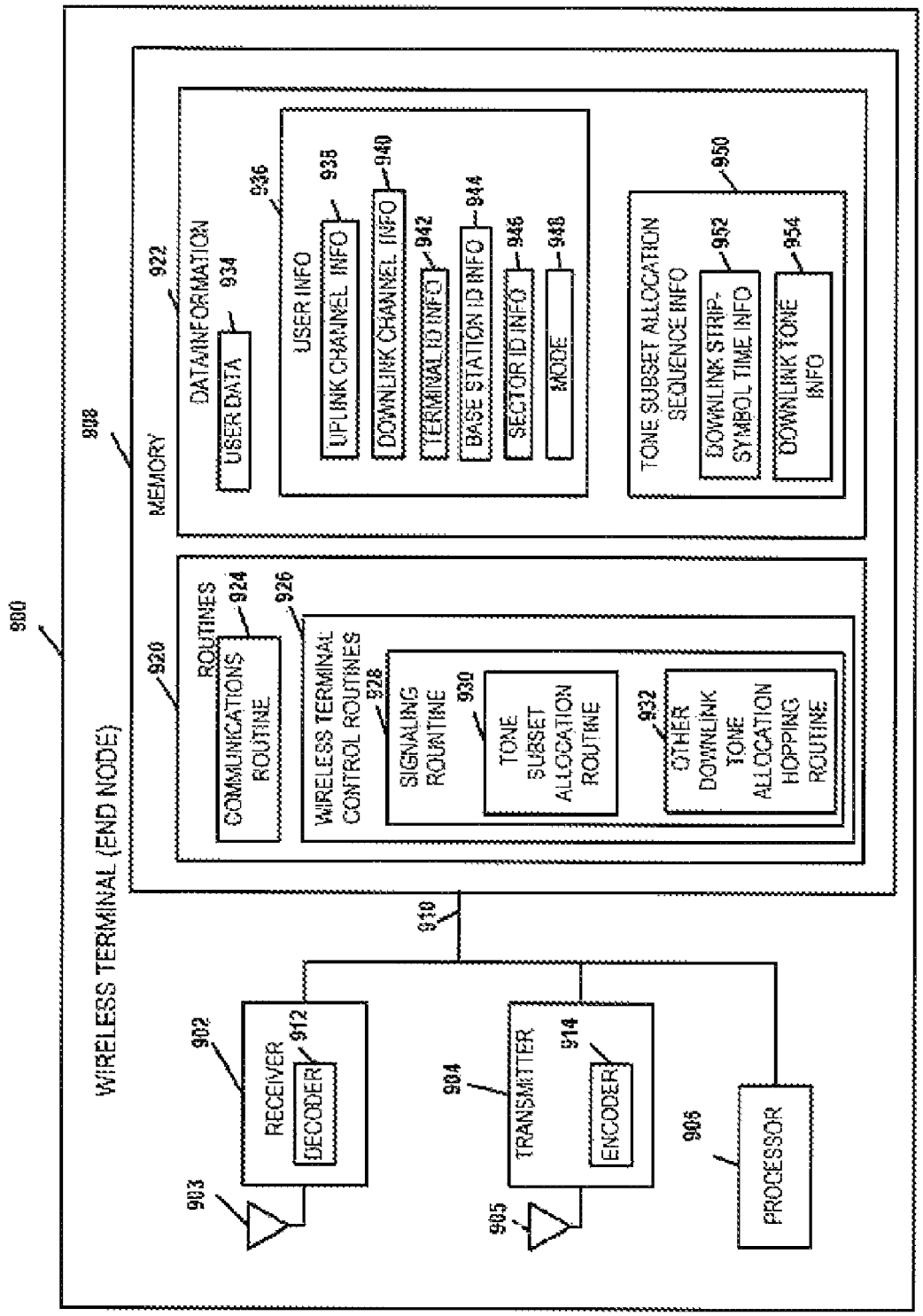
FIG. 9 is an illustration of an example wireless terminal (e.g., mobile device, end node, . . . ) implemented in accordance with various aspects described herein.

FIG. 9 illustrates an example wireless terminal (e.g., end node, mobile device, . . . ) 900 which can be used as any one of the wireless terminals (e.g., end nodes, mobile devices, . . . ), e.g., EN(1) 736, of the system 700 shown in FIG. 7. Wireless terminal 900 implements the tone subset allocation sequences. The wireless terminal 900 includes a receiver 902 including a decoder 912, a transmitter 904 including an encoder 914, a processor 906, and memory 908 which are coupled together by a bus 910 over which the various elements 902, 904, 906, 908 can interchange data and information. An antenna 903 used for receiving signals from a base station 800 is coupled to receiver 902. An antenna 905 used for transmitting signals, e.g., to base station 800 is coupled to transmitter 904.

The processor 906, e.g., a CPU controls the operation of the wireless terminal 900 and implements methods by executing routines 920 and using data/information 922 in memory 908.

Data/information 922 includes user data 934, user information 936, and tone subset allocation sequence information 950. User data 934 may include data, intended for a peer node, which will be routed to encoder 914 for encoding prior to transmission by transmitter 904 to base station 800, and data received from the base station 800 which has been processed by the decoder 912 in receiver 902. User information 936 includes uplink channel information 938, downlink channel information 940, terminal ID information 942, base station ID information 944, sector ID information 946, and mode information 948. Uplink channel information 938 includes information identifying uplink channels segments that have been assigned by base station 800 for wireless terminal 900 to vise when transmitting to the base station 800. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 940 includes information identifying downlink channel segments that have been assigned by base station 800 to WT 900 for use when BS 800 is transmitting data/information to WT 900. Downlink channels may include downlink traffic channels and assignment channels, each downlink channel including one or more logical tone, each logical tone following a downlink hopping sequence, which is synchronized between each sector of the cell.

User info 936 also includes terminal ID information 942, which is a base station 800 assigned identification, base station ID information 944 which identifies the specific base station 800 that WT has established communications with, and sector ID info 946 which identifies the specific sector of the cell where WT 900 is presently located. Base station ID 944 provides a cell slope value and sector ID info 946 provides a sector index type; the cell slope value and sector index type may be used to derive tone hopping sequences. Mode information 948 also included in user info 936 identifies whether the WT 900 is in sleep mode, hold mode, or on mode.

Tone subset allocation sequence information 950 includes downlink strip-symbol time information 952 and downlink tone information 954. Downlink strip-symbol time information 952 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 954 includes information including a carrier frequency assigned to the base station 800, the number and frequency of tones, and the set of tone subsets to be allocated to the strip-symbol periods, and other cell and sector specific values such as slope, slope index and sector type.

Routines 920 include communications routines 924 and wireless terminal control routines 926. Communications routines 924 control the various communications protocols used by WT 900. Wireless terminal control routines 926 control basic wireless terminal 900 functionality including the control of the receiver 902 and transmitter 904. Wireless terminal control routines 926 include the signaling routine 928. The signaling routine 928 includes a tone subset allocation routine 930 for the strip-symbol periods and an other downlink tone allocation hopping routine 932 for the rest of symbol periods, e.g., non strip-symbol periods. Tone subset allocation routine 930 uses user data/information 922 including downlink channel information 940, base station ID info 944, e.g., slope index and sector type, and downlink tone information 954 in order to generate the downlink tone subset allocation sequences in accordance with some aspects and process received data transmitted from base station 800. Other downlink tone allocation hopping routine 930 constructs downlink tone hopping sequences, using information including downlink tone information 954, and downlink channel information 940, for the symbol periods other than the strip-symbol periods. Tone subset allocation routine 930, when executed by processor 906, is used to determine when and on which tones the wireless terminal 900 is to receive one or more strip-symbol signals from the base station 800. The uplink tone allocation hopping routine 930 uses a tone subset allocation function, along with information received from the base station 800, to determine the tones in which it should transmit on.

Figure 10:
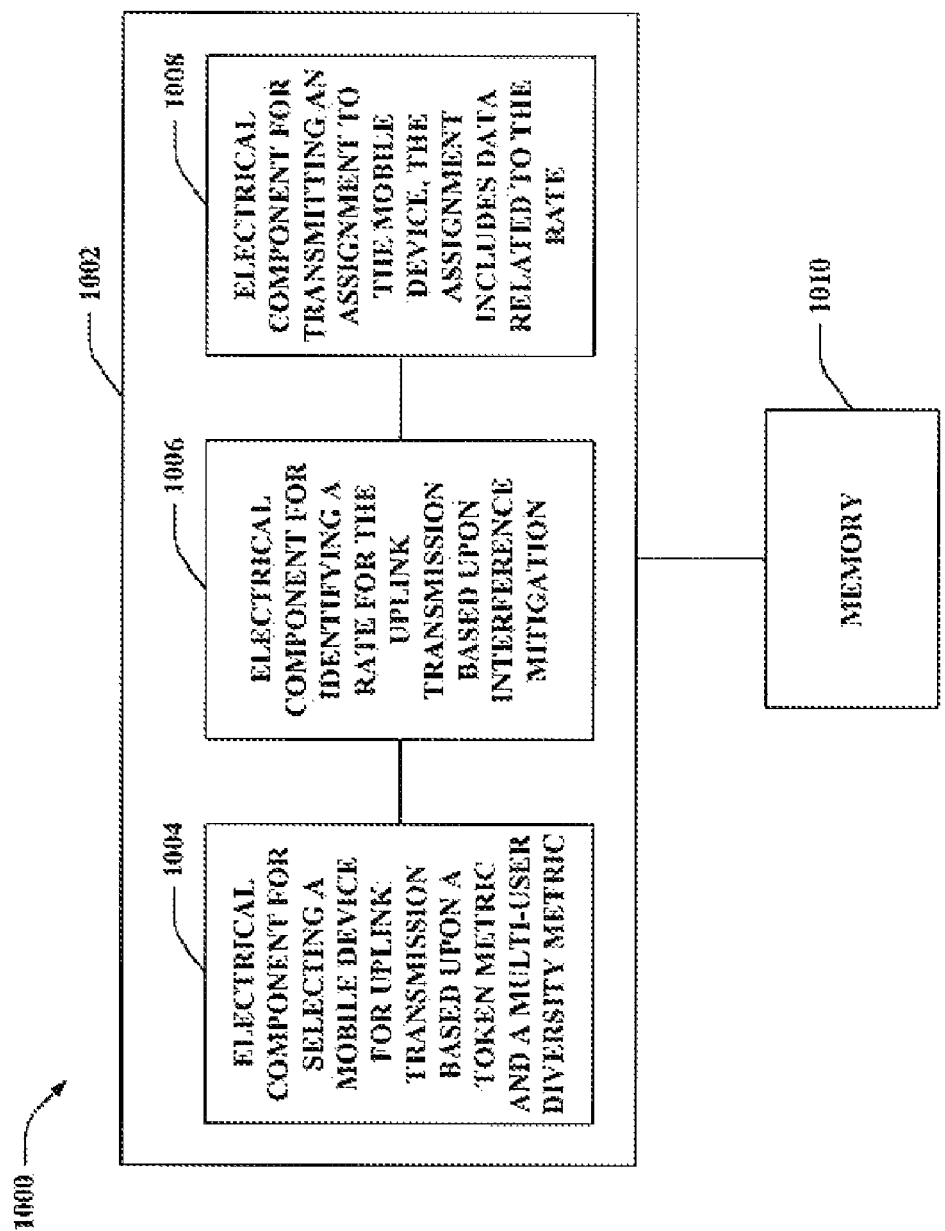
FIG. 10 is an illustration of an example system that schedules uplink transmission on traffic channels.

With reference to FIG. 10, illustrated is a system 1000 that schedules uplink transmission on traffic channels. For example, system 1000 may reside at least partially within a base station. It is to be appreciated that system 1000 is represented as including functional blocks, which may be functional blocks that represent functions implemented by a processor, software, or combination thereof (e.g., firmware). System 1000 includes a logical grouping 1002 of electrical components that can act in conjunction. For instance, logical grouping 1002 may include an electrical component for selecting a mobile device for uplink transmission based upon a token metric and a multi-user diversity metric 1004. For example, the token metric and the multi-user diversity metric may be determined based upon interference costs, traffic priorities, maximum power available for mobile device transmission, time spans since previous assignments, and/or QoS classes. Further, logical grouping 1002 may comprise an electrical component for identifying a rate for the uplink transmission based upon interference mitigation 1006. For example, the rate may be evaluated as a function of interference cost and maximum power available for mobile device transmission. Also, logical grouping 1002 may include an electrical component for transmitting an assignment to the mobile device 1008, where the assignment includes data related to the rate. By way of illustration, the assignment may additionally include data associated with a frequency, time, modulation, and so forth that may be leveraged by the mobile device for transmission on an uplink traffic channel. Additionally, system 1000 may include a memory 1010 that retains instructions for executing functions associated with electrical components 1004, 1006 and 1008. While shown as being external to memory 1010, it is to be understood that one or more of electrical components 1004, 1006 and 1008 may exist within memory 1010.

Figure 11:
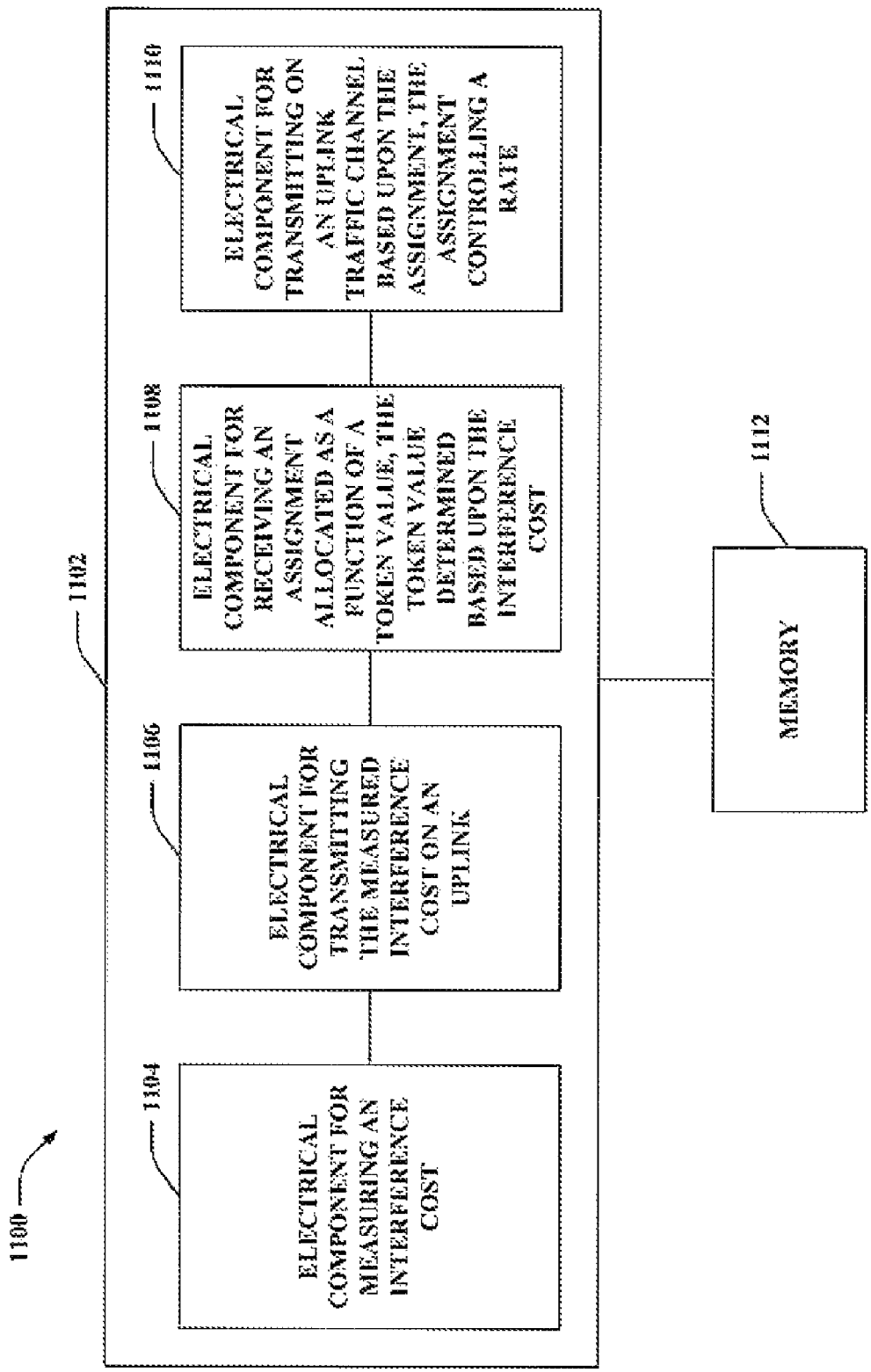
FIG. 11 is an illustration of an example system that signals a measured interference cost to a base station in connection with obtaining an uplink assignment.

Now referring to FIG. 11, illustrated is a system 1100 that signals a measured interference cost to a base station in connection with obtaining an uplink assignment. System 1100 may reside within a mobile device, for instance. As depicted, system 1100 includes functional blocks that may represent functions implemented by a processor, software, or combination thereof (e.g., firmware). System 1100 includes a logical grouping 1102 of electrical components that facilitate obtaining access to an uplink traffic channel. Logical grouping 1102 may include an electrical component for measuring an interference cost 1104. For example, the interference cost may be a Beacon ratio report, a path loss report, and so forth. Further, the interference cost may be a function of loading factors obtained from a plurality of base stations. Moreover, logical grouping 1102 may include an electrical component for transmitting the measured interference cost on an uplink 1106. By way of example, traffic priority data and/or a maximum power available for uplink transmission may additionally or alternatively be signaled on the uplink. Further logical grouping 1102 may comprise an electrical component for receiving an assignment allocated as a function of a token value 1108, where the token value is determined based upon the interference cost. Further, the token value may be obtained as a function of the traffic priority data and/or the maximum power available. Moreover, a multi-user diversity metric may be utilized to generate the assignment. Also, logical grouping 1102 may include an electrical component for transmitting on an uplink traffic channel based upon the assignment 1110, where the assignment controls a rate (e.g., code rate). Additionally, system 1100 may include a memory 1112 that retains instructions for executing functions associated with electrical components 1104, 1106, 1108, and 1110. While shown as being external to memory 1112, it is to be understood that electrical components 1104, 1106, 1108, and 1110 may exist within memory 1112.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a base station, comprising:
   generating, at the base station, a token value as a function of a maximum power that can be employed by a mobile device for transmission to the base station;
      selecting, at the base station, said mobile device to transmit on an uplink traffic channel during a time-frequency slot as a function of the token value, said selecting including:
         adding a multi-user diversity metric to said token value to generate a scheduling metric; and
         selecting the mobile device to transmit based on said scheduling metric;
   determining, at the base station, a rate for transmission on the uplink traffic channel by the mobile device; and
   sending an assignment from the base station to the mobile device.

2. The method of claim 1, further comprising:
   receiving, at the base station, information signaled on an uplink; and
   wherein determining the generated token value is based upon the received information.

3. The method of claim 2, wherein the received information relates to interference costs measured by mobile devices, traffic priorities associated with the mobile devices, and maximum power available at individual mobile devices for transmission.

4. The method of claim 1, wherein determining the rate for transmission is a function of an interference estimate.

5. The method of claim 1, wherein determining the rate is a function of an interference cost.

6. The method of claim 1, wherein said step of determining the rate further includes:
   selecting a nominal power;
   determining a transmission power based upon the nominal power, said maximum power that can be employed by a mobile device for transmission to the base station, and an interference cost;
   calculating a signal-to-noise ratio based upon the transmission power and a base station measured per tone interference; and
   mapping the signal-to-noise ratio to the rate.

7. The method of claim 1, wherein the assignment includes information related to a time, a frequency, and the rate corresponding to transmission on the uplink traffic channel.

8. The method of claim 1, further comprising transmitting a loading factor employed to yield an interference cost measured at a mobile device.

9. A base station, comprising:
a memory that retains data signaled over an uplink and instructions for controlling the base station to generate a token value as a function of a maximum power available for transmission by a mobile device, and a multi-user diversity metric based upon the signaled data, instructions for controlling choosing of said mobile device to transmit on an uplink traffic channel during a time-frequency slot based upon the token value and the multi-user diversity metric, instructions for controlling a rate for uplink transmission based upon the signaled data, and instructions for controlling transmission of an assignment to the mobile device on a downlink;
wherein said instructions for controlling choosing of said mobile device to transmit on an uplink traffic channel during a time-frequency slot further include instructions to add said multi-user diversity metric to said token value to generate a scheduling metric, and control choosing of said mobile device to transmit on an uplink traffic channel during a time-frequency slot based on the scheduling metric; and
a processor, coupled to the memory, configured to execute the instructions retained in the memory.

10. The base station of claim 9, wherein the memory further retains instructions for analyzing the token value based upon maximum power that can be employed by a mobile device for transmission to the base station.

11. The base station of claim 9, wherein the memory retains the signaled data that relates to interference costs measured by mobile devices, traffic priorities associated with the mobile devices, and maximum power that can be employed by mobile devices for transmission to the base station.

12. The base station of claim 9, wherein the memory further retains instructions for determining the rate by identifying a transmission power for utilization on the uplink traffic channel, analyzing a signal-to-noise ratio (SNR) corresponding to the transmission power and a measured interference, and mapping the SNR to the rate.

13. A base station, comprising:
means for generating, at the base station, a token value as a function of a maximum power that can be employed by said mobile device for transmission to the base station;
means for selecting said mobile device for uplink transmission based upon the token value and a multi-user diversity metric by adding said multi-user diversity metric to said token value to generate a scheduling metric and selecting said mobile device for uplink transmission based on said scheduling metric;
means for identifying a rate for the uplink transmission; and
means for transmitting an assignment to the mobile device, the assignment includes data related to the rate.

14. The base station of claim 13, further comprising means for receiving information indicating the maximum power that can be employed by said mobile device for transmission to the base station.

15. The base station of claim 13, further comprising:
means for receiving data signaled by the mobile device; and
means for analyzing the token value based at least in part upon the signaled data.

16. A non-transitory machine-readable medium having stored thereon machine-executable instructions for controlling a base station to perform the steps of:
receiving information signaled on an uplink;
generating a token value as a function of a maximum power that can be employed by said mobile device for transmission to the base station and a multi-user diversity metric based upon the received information;
assigning a time-frequency slot for uplink transmission on a traffic channel to a mobile device as a function of a combination of the token value and the multi-user diversity metric, said assigning including:
adding said multi-user diversity metric to said token value to generate a scheduling metric; and
assigning said time-frequency slot for uplink transmission on said traffic channel to said mobile device based on said scheduling metric;
selecting a code rate for the mobile device to employ for the uplink transmission; and
sending an assignment that indicates the time-frequency slot, the traffic channel, and the code rate via a downlink to the mobile device.

17. The non-transitory machine-readable medium of claim 16, further comprising machine-executable instructions for controlling the base station to transmit a loading factor that is utilized to generate at least a subset of the signaled information.

18. A base station comprising:
a processor configured to:
generate a token value as a function of a maximum power that can be employed by a mobile device for transmission to the base station;
select said mobile device to transmit on an uplink traffic channel during a time-frequency slot as a function of the token value by:
adding a multi-user diversity metric to said token value to generate a scheduling metric; and
selecting the mobile device to transmit based on said scheduling metric;
determine a rate for transmission on the uplink traffic channel by the mobile device; and
transmit an assignment from the base station to the mobile device.

19. A method of operating a wireless terminal, comprising:
signaling information including a beacon ratio report, a traffic priority, and a maximum power available to a base station over an uplink;
obtaining an uplink assignment including a rate from the base station, the assignment being generated by the base station based on a token value generated by said base station from at least the signaled information;
transmitting traffic on the uplink by employing the assignment;
wherein the signaled information is employed by the base station to obtain the token value and a multi-user diversity metric; and
wherein the rate is selected by the base station as a function of the beacon ratio report and a maximum power available to a mobile device for transmission.

20. The method of claim 19, further comprising analyzing beacon signals from disparate base stations to generate the beacon ratio report.

21. The method of claim 19, further comprising:
receiving loading factors from a plurality of base stations; and
generating the beacon ratio report as a function of the loading factors.

22. A wireless terminal for use in a wireless communication system, comprising:
- a memory that retains instructions for: measuring an interference cost, sending the measured interference cost over an uplink, and receiving data allocating a time, channel and rate for uplink traffic transmission based upon a token value that is generated by a base station as a function of the measured interference cost sent by said wireless terminal, a token update rate value which is function of a service class corresponding to a user of said wireless terminal, and a previous uplink traffic channel assignment; and
- a processor, coupled to the memory, configured to execute the instructions retained in the memory to control said wireless terminal to:
  - receive information from a base station related to an allocated uplink traffic channel, time-frequency slot, and a rate, at the wireless terminal, said uplink traffic channel being assigned to the wireless terminal as a function of: i) said token value and ii) a multi-user diversity metric; and
  - transmit traffic on the allocated uplink traffic channel during the time-frequency slot at the allocated rate.

23. The wireless terminal of claim 22, wherein the memory further includes instructions which when executed by the processor causes the processor to control said wireless terminal to transmit traffic priority data and maximum power available data over the uplink to the base station.

24. A wireless terminal that signals a measured interference cost to a base station in connection with obtaining an uplink assignment, comprising:
- means for measuring an interference cost;
- means for obtaining information indicating a maximum power that can be employed by the wireless terminal for transmission to the base station;
- means for transmitting the measured interference cost and said information indicating a maximum power that can be employed by the mobile device for transmission to the base station, on an uplink;
- means for receiving an assignment allocated as a function of a token value from a base station, the token value being generated by said base station based upon the interference cost and the information indicating a maximum power that can be employed by the mobile device for transmission to the base station; and
- means for transmitting on an uplink traffic channel based upon the assignment, the assignment controls a rate associated with transmission.

25. The wireless terminal of claim 24, further comprising:
means for obtaining traffic priority data; and
means for signaling the traffic priority data to said base station, wherein the token value is generated by said base station also as a function of the traffic priority data.

26. A non-transitory machine-readable medium having stored thereon machine-executable instructions for controlling a mobile device to perform the steps of:
- measuring an interference cost;
- obtaining information indicating a maximum power that can be employed by the mobile device for transmission to the base station;
- transmitting the measured interference cost and said information indicating a maximum power that can be employed by the mobile device for transmission to the base station, on an uplink;
- receiving an assignment allocated as a function of a token value from a base station, the token value being generated by said base station based upon the interference cost and the information indicating a maximum power that can be employed by the mobile device for transmission to the base station; and
- transmitting on an uplink traffic channel based upon the assignment, the assignment controls a rate associated with transmission.

27. The base station of claim 18, wherein said token update rate value is a predetermined fixed value corresponding to a QoS class corresponding to said user.

28. The method of claim 1, further comprising:
updating the token value as a function of a current value of the token value, a token update rate value, and said assignment.

29. The method of claim 28, wherein said updating the token value includes performing a decrement operation based on said assignment.

30. The method of claim 29, wherein said updating the token value includes performing an increment operation including adding said token update rate value to said current value.

31. The method of claim 28, wherein said token update rate value is lower for best effort traffic users than for delay sensitive traffic users.

32. The method of claim 28, further comprising:
maintaining token values for a plurality of users, said maintaining including updating token values for a plurality of different users in the same quality of service class at the same time.

33. The method of claim 28, further comprising:
determining said multi-user diversity metric from a value indicating a transmission power level being used on a dedicated control channel by said mobile communications device.

34. The method of claim 1, wherein the token value is a function of a time since a last assignment to the user.

* * * * *